United States Patent [19]
Graham et al.

[11] 3,906,779
[45] Sept. 23, 1975

[54] SHOCK-ABSORBER TEST METHOD AND APPARATUS

[76] Inventors: Robert Peter Samuel Graham; Edward Knut Patrick Graham, both of Norr Malarstrand 34, 112 20 Stockholm, Sweden

[22] Filed: Jan. 14, 1974

[21] Appl. No.: 433,097

[30] Foreign Application Priority Data
Jan. 17, 1973 Sweden .................... 73006231

[52] U.S. Cl. ........................................ 73/11; 177/4
[51] Int. Cl.² .................................... G01M 17/04
[58] Field of Search ............... 73/11, 12; 177/4, 5

[56] References Cited
UNITED STATES PATENTS
| | | | |
|---|---|---|---|
| 1,986,308 | 1/1935 | Wallace | 177/4 |
| 3,164,003 | 1/1965 | MacMillan | 73/11 |
| 3,187,554 | 6/1965 | Lackman | 73/11 |
| 3,313,142 | 4/1967 | Lackman | 73/11 |
| 3,456,489 | 7/1969 | Levenson | 73/11 |
| 3,792,604 | 2/1974 | Fader et al. | 73/11 |

*Primary Examiner*—Charles A. Ruehl
*Attorney, Agent, or Firm*—Silverman & Cass, Ltd.

[57] ABSTRACT

An apparatus for testing the operational capacity of shock absorbers mounted on vehicles includes a recording device with a weighing device and a lifting device with an attached carrying device. The lifting device lifts the vehicle wheel via the carrying device to a definite height and releases it allowing it to fall freely onto the weighing device. The recording device records the weighing device response to the wheels oscillations after being released.

9 Claims, 9 Drawing Figures

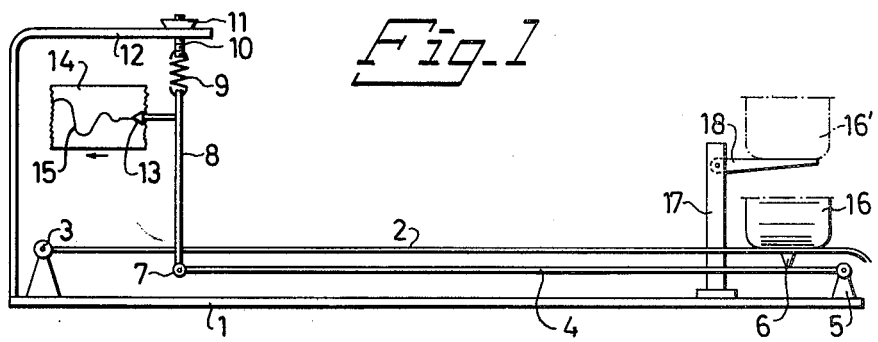
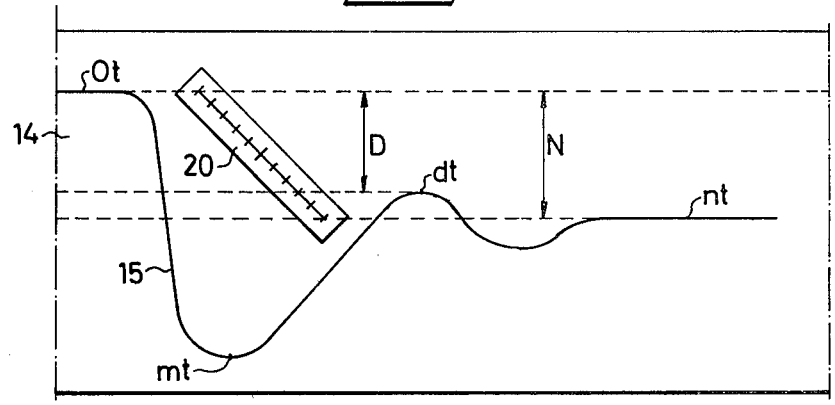
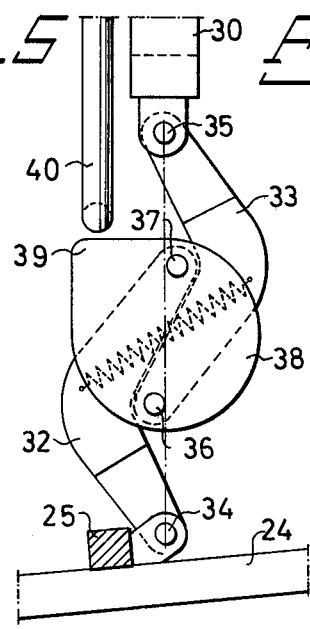 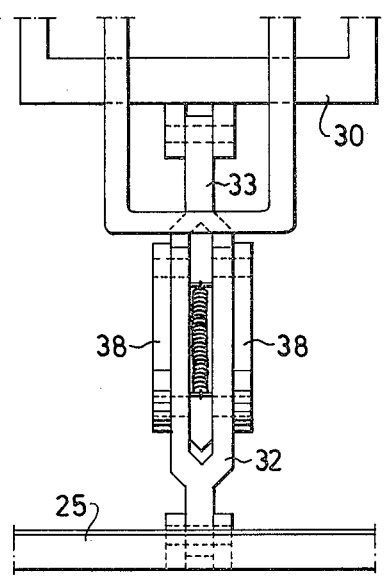

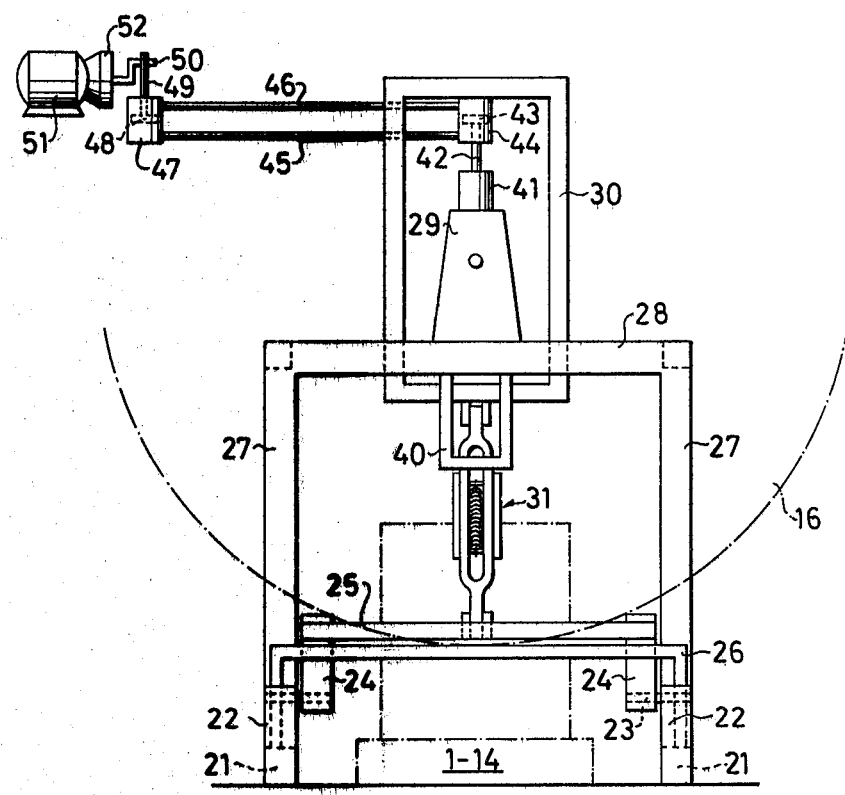

1

SHOCK-ABSORBER TEST METHOD AND APPARATUS

This invention relates to a method of testing the operation capacity of shock absorbers mounted on vehicles and to an apparatus for carrying out the method.

Shock absorbers mounted on vehicles, preferably motor vehicles, between their chassis ans wheel axle, have as their object to dampen the vertical oscillations of the vehicle arising as it moves over unevennesses in the roadway. The shock absorbers are, therefore, subjected to frequent stresses and resulting wear. As the road holding properties of a vehicle, and thereby the driving safety, depend to a great extent on the satisfactory operation of the shock absorbers of the vehicle, shock absorbers in worn-out state are a traffic safety risk. It is, therefore, important to be able regularly to test the shock absorbers.

The test arrangements at present available are of the types as follows:

Group I.

Diagram recording machines, i.e. stationary installations where only absorbers are tested and a diagram over the absorbing properties is obtained. These machines are expensive and suitable only for tests during the manufacture.

Group II.

So-called Shock Testers for recording the oscillation behaviour on a motor-driven shaking platform. These Testers are also relatively expensive and can therefore be used only in large installations, such as used for motor-car examinations and in large service shops.

Group III.

Falling-weight test apparatus for recording the oscillation behaviour of a car after a single disturbance of shocklike nature. The apparatus are intended for use in small and medium-size service shops, and they are not very expensive, but their conventional types are not specially simple to handle and scarcely adapted for use at flying inspections.

The equipments associated with Group II and Group III operate after the principle of measuring the oscillatory motions of the chassis and/or wheels, and they also are intended to test pairs of wheels. The equipments, therefore, are unnecessarily heavy and expensive and scarcely adapted as mobile installations.

The present invention has as its object to render possible a rapid and reliable testing of the shock absorbers of a vehicle by reading the pressure of the vehicle wheels, preferably of one wheel at a time, on the support, after the wheel had been subjected to a shock, and to produce a simple and easily mobile apparatus for carrying out the test.

The object is achieved according to the invention, in that the vehicle wheel disposed adjacent the shock absorber to be tested is lifted up to a definite height and by free fall caused to impact on a weighing means connected to a recorder, that the varying wheel pressure initiated by the impact on the weighing means is recorded as a curve in said recorder, from which curve it is read how great a portion, preferably in per cent, of the recorded normal wheel pressure for the wheel in question the recorded lowest wheel pressure constitutes, and that the resulting partial or percent value is used at the examination for judging the operation capacity where this is known.

It is further suitable according to the invention, that the vehicle wheel, preferably prior to its said lifting to a definite height, is subjected to oscillations in the vertical direction, and thereby the shock absorber of the wheel in question is agitated to substantially normal operation condition, before the wheel by free fall is caused to impact on the weighing means, so that the test result obtained corresponds to the properties of the shock absorber during the drive of the vehicle.

An apparatus for carrying out the method is according to the invention characterized in that it comprises a recording device with weighing means and a lifting device with carrying means for lifting a vehicle wheel to a definite height above the weighing means and releasing the carrying means so as to cause the wheel to fall freely down onto the weighing means.

The apparatus, besides, preferably comprises an oscillation supplement, by which the wheel preferably prior to its lifting to a definite height can be subjected to vertical oscillations before its free fall onto the weighing means.

The method according to the invention is explained in the following by way of describing an embodiment of the apparatus according to the invention shown in the accompanying drawings.

FIG. 1 shows in a schematic way a recording apparatus according to the invention.

FIG. 2 shows a diagram drawn in the recording apparatus.

FIGS. 5 and 6 show on a larger scale, partially in section, some parts included in the lifting device according to FIGS. 3 and 4.

FIG. 7 shows a view of the apparatus of a modified design.

Figure 3:
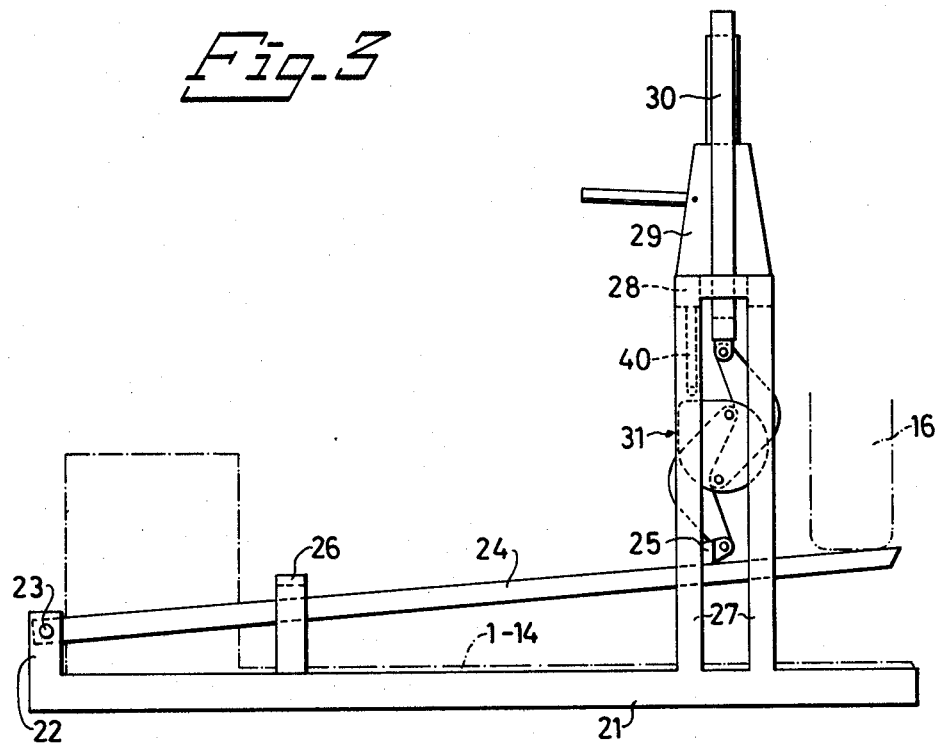
FIGS. 3 and 4 show two different views of a lifting device according to the invention comprised in the apparatus.

The recording apparatus shown in a very schematic manner in FIG. 1 comprises a base 1 intended to rest on the ground, a floor etc., on which base a relatively oblong weighing plane 2 is supported at one end for vertical oscillation in a bearing 3, and a relatively oblong weighing arm 4 is supported at one end for vertical oscillation in a bearing 5. The other end of the weighing plane 2 rests by means of a pressure body 6 on the weighing arm 4 near to its bearing 5. The other end of the weighing arm 4 is connected via a joint 7 to a drawing bar 8, which is secured at one end of a tension spring 9, at the other end of which a screw 10 threaded into a nut 11 is fastened. The nut is supported on a yoke 12, which is connected to the base. On the drawing bar 8 a drawing pencil 13 is fastened to be movable therewith and to co-act with a recording card or recording tape 14 running in the direction of the arrow, so that the drawing pencil draws a curve 15 whilst the card or tape is running.

The weighing plane 2 is intended to co-act at the place of the pressure body 6 with a partially shown vehicle wheel 16, which can be lifted by a lifting device, e.g. a jack 17 with releasable carrying arm 18, to a certain height, indicated by the dash-dotted line 16'.

The apparatus described is operated and acts for the testing of a shock absorber of a vehicle, e.g. a motor-car, in the way as follows. A car wheel 16 is lifted by the lifting device 17, 18 to the upper position, indicated by the dash-dotted line 16'. The weighing plane 2 is not loaded. When the tape 14 starts running, the drawing pencil 13 draws a zero-pressure line Ot farthest to the left on the tape 14, see FIG. 2. A rapid release of the carrying arm 18 causes the wheel 16 to fall freely down onto the weighing plane 2 and applies a maximum pressure thereon. It is to understood that the term "fall freely" or "freely" is defined to mean: the fall of the wheel 16 unencumbered by any structures external to the wheel and car and due only to the weight of the wheel and the actions of the vehicle suspension attached to the wheel. The pressure is transferred to the drawing pencil 13, which draws a downwardly directed curve line to a lowest point mt. Thereafter the maximum pressure decreases owing to the car chassis and body being connected with the wheel via spring systems and shock absorbers. As the weighing parts 2, 4, 8 due to the tension spring 9 are forced to participate in the wheel movement during the reduction in pressure, the drawing pencil draws an upwardly directed curve line to a highest point dt. Thereafter the drawing pencil continues to draw the curve by action of the decreasing oscillations of the wheel and, respectively, weighing means until these oscillations have ceased, and the wheel as well as the weighing means are in a position of resting. Then the normal pressure line nt is drawn.

The recording tape preferably should be provided with parallel auxiliary lines in the direction of motion. The efficiency degree D of the shock absorption can thereafter be expressed directly in per cent, by measuring the lowest pressure arising during the re-oscillations, and stating how great a percentage of the normal pressure N the D-value constitutes. A still simpler way is to utilize a reasonably long transparent measuring scale 20 with the division from 0 to 100. This scale 20 is placed with the end points on the zero pressure and, respectively, normal pressure lines, and D in per cent is read where the scale intersects the line through dt. From this can be concluded how many per cent the shock absorber has allowed the car wheel to reduce the normal pressure on the roadway or, in other words, how great a percentage the grip capacity of the car wheel has decreased. Thus, advance information on the characteristics of the tested car as in the case of other recording apparatus is not required.

Figure 4:
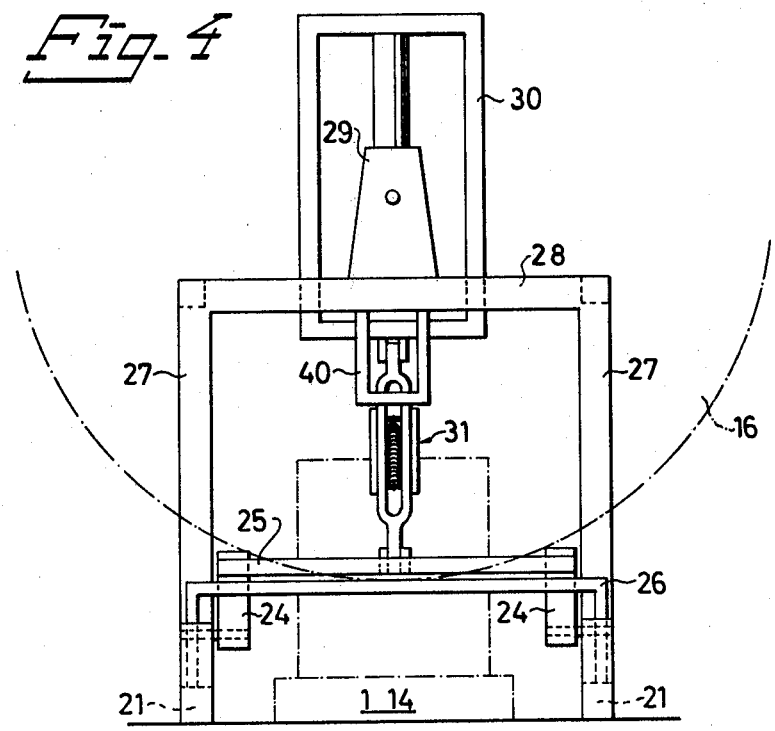

The lifting device 17, 18 shown schematically in FIG. 1 preferably is designed as shown in FIGS. 3 and 4. Two parallel base bars 21 are provided with a vertical portion 22, at the upper end of which lifting arms 24 are supported on a pin 23 and interconnected by a transverse yoke 25. The base bars 21 are also interconnected by a bow 26. Each base bar 21 is provided with a pair of vertical uprights 27, which at the upper end are interconnected by transverse yokes 28. On said yokes a lifting device is mounted, e.g. a hydraulic jack 29, which supports a lifting frame 30, at the lower portion of which a lifting and releasing means 31 is suspended. The lower end of said means 31 is connected to the transverse yoke 25. A stop member 40 is fastened in one transverse yoke 28 for co-action with said means 31.

The lifting device operates as follows. The base bars 21 and the forward ends of the lifting arms 24 are inserted from the side beneath the wheel 16 to be tested. The lifting arms 24 are lifted by the jack 29 to such a height, that the recording apparatus 1–14 shown by dash-dotted lines in FIGS. 3 and 4 can be inserted beneath the wheel. The recording mechanism is started, and the lifting operation is completed until a stop edge on the means 31 meets the stop member 40. Upon continued lifting, the means 31 releases, and the wheel falls freely down onto the recording weighing means 2, 4, 8.

The lifting and releasing means 31 is shown more clearly in FIGS. 5 and 6. Links 32, 33 of slightly angular shape are pivotally connected at one end with the transverse yoke 25 between the lifting arms 24 and, respectively, with the lifting frame 30 by means of bearing bolts 34, 35, while the other ends of the links 32, 33 are pivotally connected by axle journals 36, 37 with side plates 38, which are provided with a stop edge 39 for co-action with the stop member 40 fastened on the transverse yoke 28. The links 32, 33 can be pivoted against each other, in conjunction with the turning of the side plates 38, whereby the links 32, 33 together will assume the shortest length, and their axle journals 36, 37 will pass over a straight line between the bearing bolts 34, 35 of the links, whereafter the links move to abut each other and are locked in this position. Upon the lifting of a wheel, the stop edge 39 gradually meets the stop member 40, which during the continued lifting operation causes the side plates 38 to turn and take along in their movement the axle journals 36, 37. When said journals are passing over said straight line, the load in the links will be capable of suddenly turning the side plates 38, so that the link 32 suddenly is drawn down beneath the link 33, and the lifting arms 24 permit the wheel 16 to fall freely onto the weighing plane. The pressure recording and reading take place in the manner described above.

Among the advantages of the method and apparatus according to the invention may be mentioned that for carrying out the test as described above no advance information on the characteristics of the vehicle is required, but the wheel simply may be lifted and dropped down onto the recording weighing means, whereafter the operation capacity of the shock absorber can be read as a value expressed as per cent of the normal wheel pressure. The apparatus need not be coupled to other parts of the vehicle and is easy and simple to handle. The apparatus, due to its simplicity, can be designed for mobile and stationary use, and easily and handily be assembled and use for flying tests of the shock absorbers of a vehicle. It is in this conjunction of particular value that the entire test procedure can be carried out and the result be obtained very rapidly and simply by the apparatus according to the invention.

It was, however, found desirable to improve the test result with respect to the control of conventional hydraulic telescopic shock absorbers of the double-tube type, which is most commonly used, and in which during the drive of the vehicle foam develops, which reduces the absorbing capacity. The desired improvement is achieved by the embodiment shown in FIG. 7 which, in addition to the design shown in FIGS. 3 and 4, with the same designations as in said Figures, also comprises between the jack 29 and lifting frame 30 an oscillation supplement as follows. The piston rod 41 of the jack 29 is connected by a piston rod 42 with a disc-shaped piston 43 in a hydraulic working cylinder 44, which is rigidly connected with the lifting frame 30. The cylinder 44 is connected on each side of the piston 43 to a hydraulic pump 47 with a piston 48, by means of relatively long flexible pipe conduits 45 and 46. The piston rod 49 of the piston 48 is connected with a crank 50 on the shaft to an electromotor 51, which preferably includes a variable gear 52 between the motor shaft and the crank.

The device described is operated and acts as follows. The lifting arms 24 are inserted beneath the vehicle wheel at the shock absorber to be tested. The vehicle wheel is lifted at a first step only as much as to permit a weighing means 1–14 indicated by dash-dotted lines be inserted to its position. Thereafter the motor 51 is started so that the piston 48, and thereby the piston 43, are caused to perform a rapidly pulsatory vertical motion, which via the lifting frame 30, lifting and releasing means 31 and lifting arms 24 is transferred to the vehicle wheel 16, and thereby also to its shock absorber to be tested. When the shock absorber is caused to perform this rapidly pulsating or oscillating motion during a suitably adjusted period, foam develops in the shock absorber, which thereby assumes the same condition as during the drive of the vehicle. Thereafter the lifting of the wheel 16 is completed in a second step by means of the jack 29 until the releasing means 31 becomes operative and causes the vehicle wheel to fall freely down onto the weighing means, thereby subjecting the weighing means to a maximum pressure, which gradually diminishes. If the stop member 40 is replaced by a manually releasable locking device, the lifting operation need not be carried out in two steps, but can bbe effected directly to a definite height, whereafter the motor 51 is started for bringing about oscillation and after a suitable time the locking device is released manually. As the deflections of the recording apparatus occur whilst the shock absorber by said oscillation is in agitated state, the shock absorber acts in the same way as it normally does in a vehicle in drive.

The advantage of the embodiment, consequently, is that the test result shows the real operation properties of the shock absorber as truly as possible. The variable gear 52, moreover, provides the advantage that the operation frequency of the oscillation supplement can be varied within the range desired.

Figure 8:
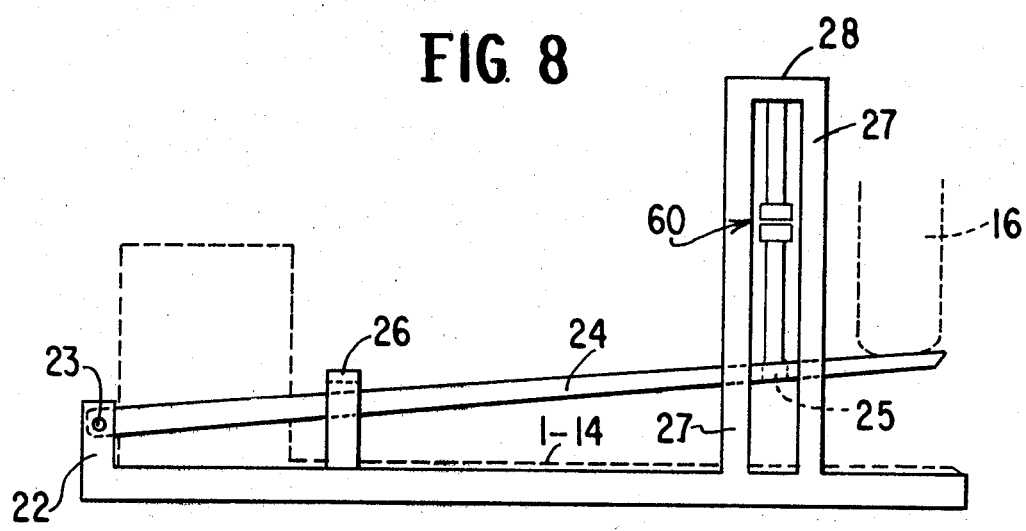
FIGS. 8 and 9 show two different views of a modified lifting device according to this invention.
Figure 9:
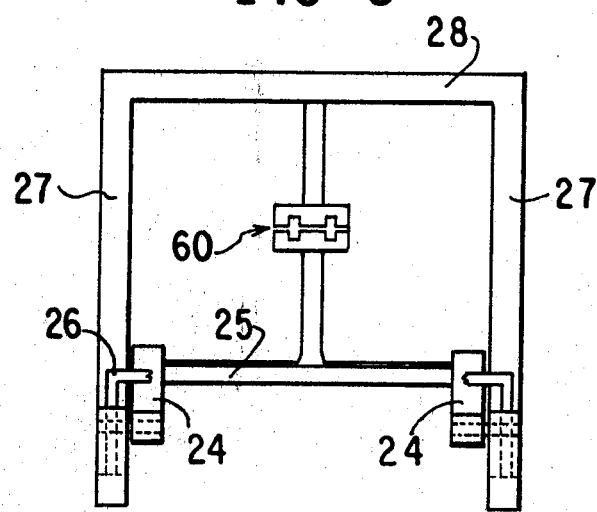

The apparatus for carrying out the method according to the invention may, of course, be designed in a way other than described above. The details in the weighing means and recording apparatus, for example, and the connecting means therebetween, such as the adjusting means 9–11, may be varied. The lifting and releasing means may be designed differently, as for example shown in FIGS. 8-9, they advantageously may consist of a holding magnet 60 attached between the lifting arms and the transverse yoke or some other part of the uprights, because if an apparatus according to the invention is mounted on each of two wheels of a vehicle, the two holding magnets can simply be caused to release simultaneously and thereby ensure that the wheels fall simultaneously. The recording apparatus and the lifting device may be assembled together, or preferably the lifting device may have guides, on which the recording apparatus can be moved and positioned. The oscillation supplement may be designed in different ways, depending on the design of the lifting device in its entirety.

We claim:

1. A method of testing the operational capacity of a shock-absorber mounted on a vehicle and attached to a vehicle wheel including the steps of;

lifting the vehicle wheel to a definite height above a weighing device connected to a recorder, dropping the wheel and allowing it to fall freely onto the weighing device, and recording on paper a currve of the movement and osicillations of the weighing device in response to the impact and oscillation of the wheel.

2. A method according to claim 1 further including the step of oscillating the wheel prior to dropping same for agitating said shock-absorber to a substantially normal operational condition.

3. An apparatus for testing the operational capacity of shock-absorbers mounted on a vehicle and attached to the vehicle wheels including in combination, a recording device having a weighing means, and a lifting device having a carrying means for lifting one of the vehicle wheels to a definite height above the weighing means and releasing the wheel so as to cause the wheel to fall freely down onto the weighing means, said recorder means being operative to form a curve of the weighing means oscillations in response to impact and oscillation of the wheel thereon.

4. An apparatus according to claim 3 wherein the weighing means includes, and oblong weighing plane for receiving and responding to said wheel impact and oscillations, said recording device including a pressure body in contact with said weighing plane and resting on an oblong weighing arm adjacent a weighing arm mounting and pivot bearing, said weighing arm being pivotally connected to a spring loaded drawing bar having a drawing pencil thereon, and one of a movable recording card and sheet in contact with said drawing pencil for recording said curve.

5. An apparatus according to claim 3 wherein the carrying means includes a pair of lifting arms and the lifting device comprises a lifting and releasing means mounted between said pair of lifting arms and supported on base bars, and a lifting frame coupled to said lifting and releasing mechanism and a jack means and liftable by said jack means, said jack means being supported on vertical uprights.

6. An apparatus according to claim 5 wherein the lifting and releasing means includes first and second links having an angular shape and extending in the longitudinal direction, said first link having one end thereof pivotally connected to a transverse yoke, said yoke being secured to the lifting arms, said second link having one end thereof pivotally connected to the lifting frame, the other end of said first and second links being pivotally connected to a pair of side plates, said plates being rotatable to a first positon for pivoting said links to lift the lifting arms, said links in said first position abutting one another and locking, said plates being rotatable to a second position for lowering said lifting arms whereby said vehicle wheel is released to fall freely onto the weighing means.

7. An apparatus according to claim 5 wherein the lifting and releasing means is a holding magnet mounted between the lifting arms and a transverse yoke supported on one of the uprights.

8. An apparatus according to claim 5 wherein the lifting device includes an oscillation device for oscillating the vehicle wheel prior to its free fall onto the weighing means.

9. An apparatus according to claim 8 wherein the oscillation device is coupled between the lifting frame and jack means and includes a working cylinder coupled to the lifting frame, said cylinder having a piston herein coupled to the jack means said piston adapted to reciprocate in response to a force coupled thereto and oscillate said lifting frame, conduit means coupling said working cylinder to a pump means, said pump means being operative to supply said force to said piston, and a motor means coupled to said pump for operating said pump, said motor means including means for varying said pump operation such that said force varies.

* * * * *